Patented Dec. 23, 1952

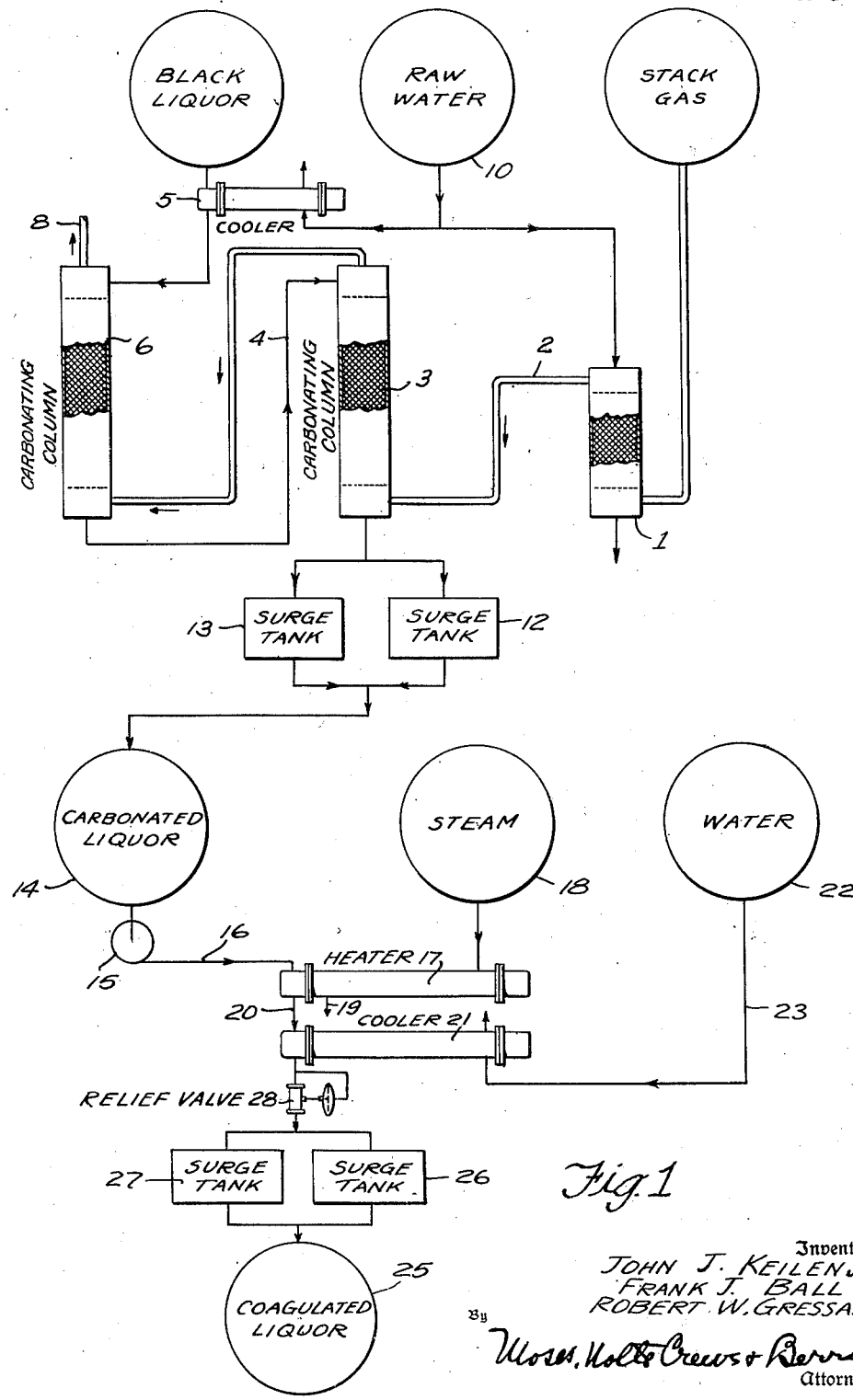

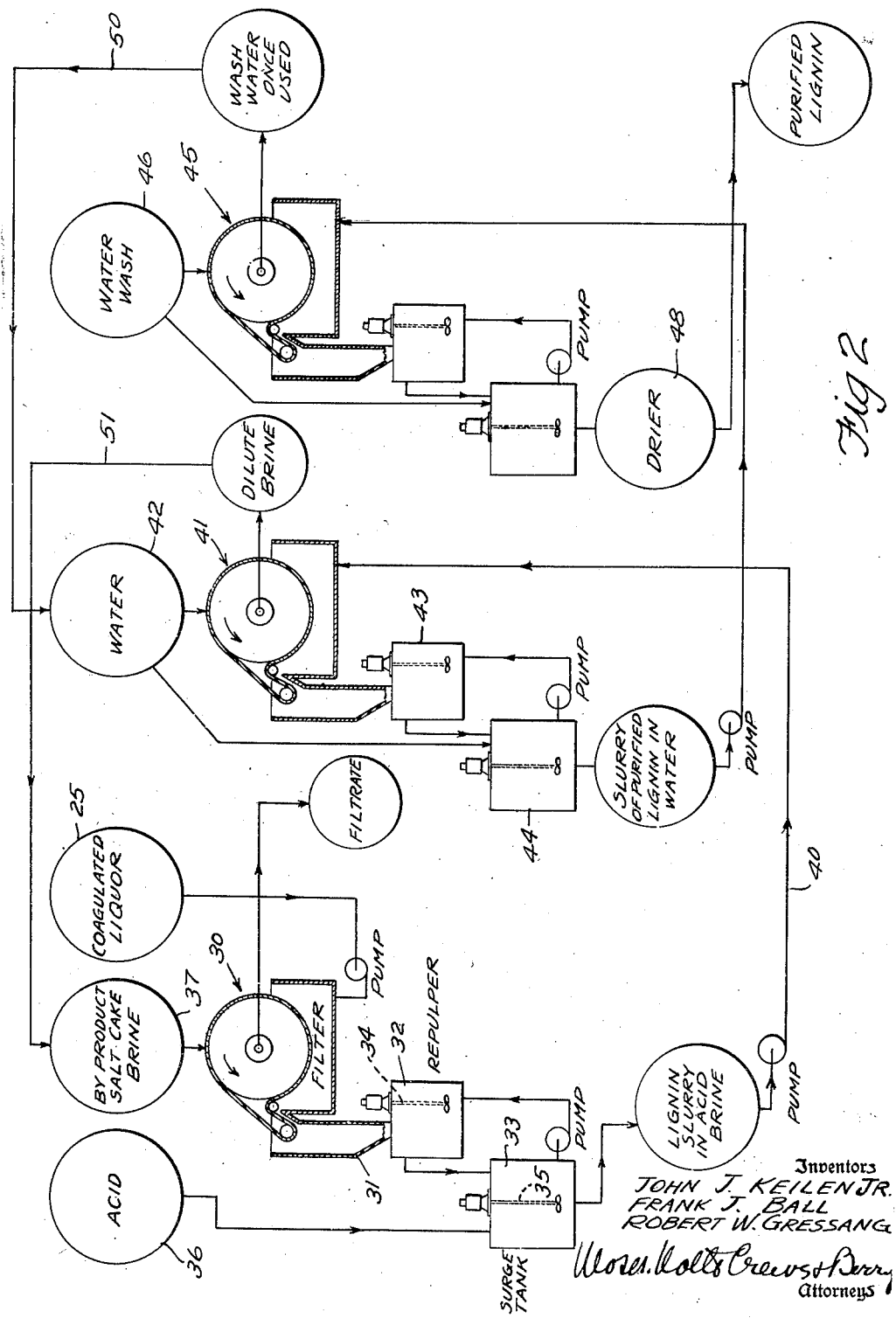

2,623,040

UNITED STATES PATENT OFFICE 2,623,040

METHOD OF COAGULATING COLLOIDAL LIGNATES IN AQUEOUS DISPERSIONS

John J. Keilen, Jr., Frank J. Ball, and Robert W. Gressang, Charleston, S. C., assignors to West Virginia Pulp and Paper Company, New York, N. Y., a corporation of Delaware Application July 6, 1950, Serial No. 172,332

6 Claims. (Cl. 260—124)

Our present invention relates to improvements in methods of producing lignin from black liquor. More specifically it has to do with improvements in the step of coagulating precipitated sodium lignate. Further, our invention concerns the subsequent conversion of the obtained sodium lignate into lignin.

In the manufacture of lignin from so-called black liquor (the effluent from either the soda or sulfate process of making pulp from wood or other cellulose-containing vegetable matter), it has been proposed first of all to lower the pH of the suitably concentrated black liquor to a point where the sodium lignate precipitates. The point at which precipitation occurs and the yield of sodium lignate obtained vary somewhat with the concentration of the black liquor started with. In carrying out the precipitation substantially any acidifying agent may be used. However, for reasons of economy and convenience the use of carbon dioxide gas has been proposed by many workers in this field. Thereby the pH may be lowered to around 9.6 and a substantial proportion of the sodium lignate precipitated. Further quantities of sodium lignate may be recovered by lowering the pH further by means of stronger acid materials as for example sulphur dioxide, strong mineral acids such as sulfuric, hydrochloric, etc. In many instances it is desirable not to precipitate the lignin completely for the reason that by so doing an excessive quantity of the mineral salts and other impurities are precipitated with the sodium lignate. Our present invention particularly relates to the recovery of sodium lignate after carbonation or other acid precipitation.

Our invention is predicated on our study of the physical nature of the precipitated sodium lignate particle and upon its behavior under different conditions of treatment effecting coagulation. Unless it is first coagulated it is not practicable to recover the precipitated sodium lignate by filtration. However, the mere heating of the carbonated material to effect coagulation leads to variable and haphazard results. As a result of our study we have devised a method of effectively controlling the particle size of the precipitated sodium lignate and hence the filtration rate of the sodium lignate suspension. Since the sodium lignate may be converted to lignin without having to redissolve it, the particle size of the sodium lignate thus determines that of the final lignin product.

Our discovery is based upon our observation that the particle size is governed by the degree of agitation of the aqueous suspension of the particles at a selected temperature. As originally formed the gel particles of sodium lignate act as molecular sponges which soak up large volumes of liquid. While they are cool these hydrated particles do not tend to agglomerate, possibly due to the protective effect of the water of hydration surrounding each particle. The action of heating, however, permits the particles to diffuse through the hydration layers and actually fuse with adjoining particles. If left undisturbed this fusing action and particle growth will continue until the total amount of lignin present is in the form of one liquid mass. By maintaining mild agitation, the particles can be kept from fusing to one mass but the particles still grow in size sufficiently to facilitate filtering. If very violent agitation is used, the particles tend to agglomerate very little and remain of such particle size that they are very difficult to filter. After the particles of a given size have been formed by regulating the degree of agitation, it is desirable that they be kept from fusing into a liquid mass and to accomplish this the liquor is preferably cooled while kept in the required state of motion.

In general, we have found it practicable to heat the carbonated liquor to a point within the temperature range beginning several degrees below the boiling point of the liquor and extending several degrees beyond it. An example of this range is 185° F. to 220° F. We have also found it quite desirable that when using temperatures greater than the boiling point of the liquor, the liquor be maintained at a sufficient pressure as to prevent its boiling. When the liquor boils, it is agitated to an undesirable degree with the result that the particle size is so greatly reduced that filtration is rendered difficult or impracticable. A further drawback resulting from boiling within the tubes is that the carbon dioxide gases off, thus increasing the pH and rendering the lignin more soluble. There is also the danger of depositing lignin or other solid within the heating tubes. We have therefore found it a good rule of practice, when heating the carbonated liquor in a tube heater, to maintain the pressure on the liquid at five pounds above that of the steam on the outside of the heating tubes, which is used at the heating medium. In general we prefer to heat the liquor to within the upper part of the temperature range given, although we have found no one temperature above the minimum given, i. e., 185° F., to be critical. However, no advantages has been found to result from the use of temperatures above the upper limit given.

Particularly when operating at temperatures above 175° F., the amount of agitation to which the liquor is subjected during the heating is critical. In general, we prefer to operate at a degree of agitation (most conveniently expressed in Reynolds numbers) below that of turbulence, that degree of agitation at which turbulence begins being around 2100 Reynolds. Agitation greater than this produces uncertain results. Most conveniently we heat the carbonated liquor to effect coagulation by passing it through a coil which is exteriorly heated and then immediately passing it to a second coil which is cooled. In this way the agitation can be varied by the velocity with which the liquor is passed through the heating coil. Once having effected coagulation by heating it at a proper flow velocity, the liquor should be cooled to prevent the particles from fusing into a solid mass, as above pointed out. By so proceeding, the size of the lignin particles may be controlled from 2 to 300 microns diameter, it being understood that the lower the Reynolds number, the greater the particle size. For a lower limit of agitation, we would choose a Reynolds number of 700. While Reynolds numbers lower than this may be used, there is some danger when so proceeding that the lignin may burn in the heating tubes. Also the precipitate may be so bulky as to be objectionable.

The following data give the effect of agitation on coagulation:

| Reynolds number in Heater | Particle Size (Microns) | Max. Temp., °F. | Filtration Number | Particle Shape |
| --- | --- | --- | --- | --- |
| 750 | 10-100 | 197 | 45.9 | Clusters. |
| 900 | 10-300 | 195 | 22.1 | Do. |
| 1,200 | 20-300 | 196 | 99 | Do. |
| 1,500 | 15-30 | 195 | 63.6 | Do. |
| 2,000 | 3-7 | 194 | | Do. |
| 2,500 | 1 | 193 | | Spheres. |

In the last two tests, the filtration was so slow as to be impracticable. The filtration number given is the calculated number of pounds of lignin per hour obtained when filtering the coagulated liquor through a Buchner funnel under constant conditions of temperature and pressure.

Our invention will be best understood by reference to the following detailed description taken with the annexed drawings which illustrate diagrammatically a layout of apparatus suitable for carrying out our improved method. In said drawings:

Figure 1 shows a preferred hook-up of apparatus for carbonating and coagulating the black liquor and Figure 2 shows the hook-up of apparatus for converting the precipitated sodium lignate into lignin.

Referring to Fig. 1, stack gas is first introduced into the cooling column 1 consisting of a packed tower where it is cooled for example to the neighborhood of 110° F. It is then passed through pipe 2 to the second packed (carbonating) tower 3 wherein it flows countercurrent to a stream of black liquor entering at the top of the column through pipe 4. Previously the black liquor from the source shown has been cooled in cooler 5 and then passed through carbonating column 6 similar in construction to column 3. In column 6 the once-spent gas passed from tower 3 through pipe 3a initially carbonates the black liquor, which then passes to column 3, already mentioned. The stack gas after traversing columns 3 and 6 exists through pipe 8. Water for cooling the column 1 and the cooler 5 is shown from a source 10. The finally carbonated black liquor leaving column 3 passes through either surge tank 12 or surge tank 13 as may be desired and is collected in the tank 14, the necessary piping being indicated in Fig. 1.

The carbonated liquor from the tank 14 is now pumped by pump 15 through pipe 16 to a tubular heater 17 which is heated by steam from source 18, the exhaust steam and condensate leaving through the exit pipe 19. The thus heated carbonated liquor leaves the heater through pipe 20 through which it is fed to the cooler 21 which is provided with cooling water from the source 22 through pipe 23. The so treated liquor is then passed to the coagulated liquor tank 25 through either of the intermediate surge tanks 26 and 27. A regulating valve 28 is also provided of usual type, in order to maintain the pressure of the carbonated liquor substantially constant.

It will be evident that the velocity of the liquor through the heater 17 and cooler 21 will be regulated by the action of the pump 15 and that the temperature in the heater 17 will be regulated by the amount of steam fed thereto from source 18.

The coagulated liquor of tank 25 may now be filtered to recover the crude sodium lignate which may thereupon be washed with a solution of sodium sulfate or other salt to remove occluded black liquor and then dried. Unless a strong electrolyte is used as the washing medium, sodium lignate will dissolve. For many uses the presence of sodium sulfate for example left by the wash in the sodium lignate is unobjectionable.

For the recovery of purified lignin, the following steps may be performed.

Coagulated liquor in tank 25 is pumped to a filter 30 of the continuous type, the precipitate being continuously fed into the hopper 31 and the repulper tank 32 in circuit with which is surge tank 33, said tanks being provided with agitators 34 and 35 respectively. Sulfuric acid of suitable strength, as for example of a pH of 0.5, may be added to tank 33 from source 36 in an amount to give a pH of preferably around 2 when the filter cake from filter 30 has been added thereto. Simultaneously with the filtering operation, the filter cake on the filter medium is continuously washed, preferably by salt cake brine, i. e., aqueous solution of acid sodium sulfate, from source 37. The acidified slurry is allowed to remain in the tanks 32 and 33 for a period of 8 hours more or less. At the end of this period the pH should not rise above 3. The slurry of the formed lignin is then pumped through pipe 40 to filter 41 which may be of the same type as filter 30. Here the lignin is separated from the attendant liquor containing brine and small quantities of black liquor originally present, by washing with water from tank 42. Filter cake from filter 41 is again repulped in tanks 43, 44 with water from tank 42. Preferably the lignin is again purified by filtration on filter 45 similar to filters 41 and 30. The precipitate on filter 45 is washed with the purest available water from tank 46. Again the precipitate is repulped with pure water from tank 45 to a slurry containing a maximum of 38% solids which is passed to drier 48 of the spray type. The once used wash water from filter 45 may be fed through pipe 50 to tank 42 for use on filter 41 whereas the filtrate from filter 41 consisting of a dilute brine is passed through pipe 51 to the tank 37 where it mingles with a strong solution of salt cake.

In use it is found that a 10% solution of salt cake for treatment of the sodium lignate is satisfactory.

It will be noted that in the conversion of sodium lignate into lignin the sodium lignate is kept from dissolving by the effect of the brine. If an appreciable quantity of the sodium lignate is allowed to dissolve, the subsequent addition of acid precipitates lignin from the dissolved sodium lignate. The so-precipitated lignin is of a considerably smaller particle size than the original sodium lignate, and thus hinders the subsequent filtering step. However, by keeping the sodium lignate always out of solution this drawback is avoided. On the other hand, when not more than 90% of the occluded black liquor is removed from the cake on filter 30, the washing medium may be water which if used cautiously will not result in an objectionable quantity of dissolved sodium lignate being formed.

It will be understood that other types of agitation may be employed provided the agitation produced comes within the specified Reynolds numbers. When using a stirrer, for example, it will be understood that some of the liquor in contact with the stirrer may be brought to turbulence in order that the rest of the liquor may have the requisite average agitation. Because of the lack of uniformity which obtains when a stirrer is used, it is preferred to produce the required agitation by the means shown, i. e., by flow through a pipe of the requisite diameter.

We claim:

1. The method of coagulating colloidal lignates resulting from the acid precipitation thereof in black liquor which comprises passing a stream of the so acidulated black liquor through a tubular zone while said stream is maintained at a temperature in excess of 170° F. and under a pressure in excess of the vapor pressure corresponding to such temperature and controlling the particle size of the coagulated lignate by maintaining said liquor under agitation corresponding to a Reynolds number not substantially in excess of 2100, then while said liquor is still in motion cooling the same to prevent fusion of the lignate particles, and filtering the coagulated lignate particles from the black liquor.

2. The method according to claim 1 including the step of precipitating the lignin by first filtering the coagulated sodium lignate, washing said coagulated sodium lignate and treating same with a mineral acid, all without dissolving any substantial quantity of said lignate as such and precipitating colloidal lignin therefrom.

3. The method according to claim 1 in which said temperature range within which the liquor is heated is from 170 to 220° F.

4. The method according to claim 3 in which the agitation of the heated liquor is within the range of 700 and 1500 Reynolds.

5. The method according to claim 1 in which the acidulation of the black liquor is brought about by the addition thereto of carbon dioxide.

6. The method of coagulating colloidal lignates in black liquor resulting from the carbonation of same which comprises passing a stream of the carbonated liquor through a tubular heating zone while said stream is maintained at a temperature between 170° F. and 220° F. and under a pressure sufficient to prevent any substantial gassing off of the dissolved carbon dioxide while also maintaining the velocity of said stream through said zone to give a Reynolds number representing the degree of agitation thereof in the range of 700 to 1500, then cooling said stream while the same is still in motion to prevent fusion of said lignate particles, and filtering the coagulated lignate particles from the black liquor.

JOHN J. KEILEN, Jr.
FRANK J. BALL.
ROBERT W. GRESSANG.

REFERENCES CITED

The following references are of record in the file of this patent:

UNITED STATES PATENTS

| Number | Name | Date |
| --- | --- | --- |
| 2,406,867 | Tomlinson et al. | Sept. 3, 1946 |

FOREIGN PATENTS

| Number | Country | Date |
| --- | --- | --- |
| 2,012,125 | France | Aug. 20, 1935 |